V. CLAIREMONT.
AUTOMATIC EGG PRESERVING APPARATUS.
APPLICATION FILED MAR. 10, 1920.

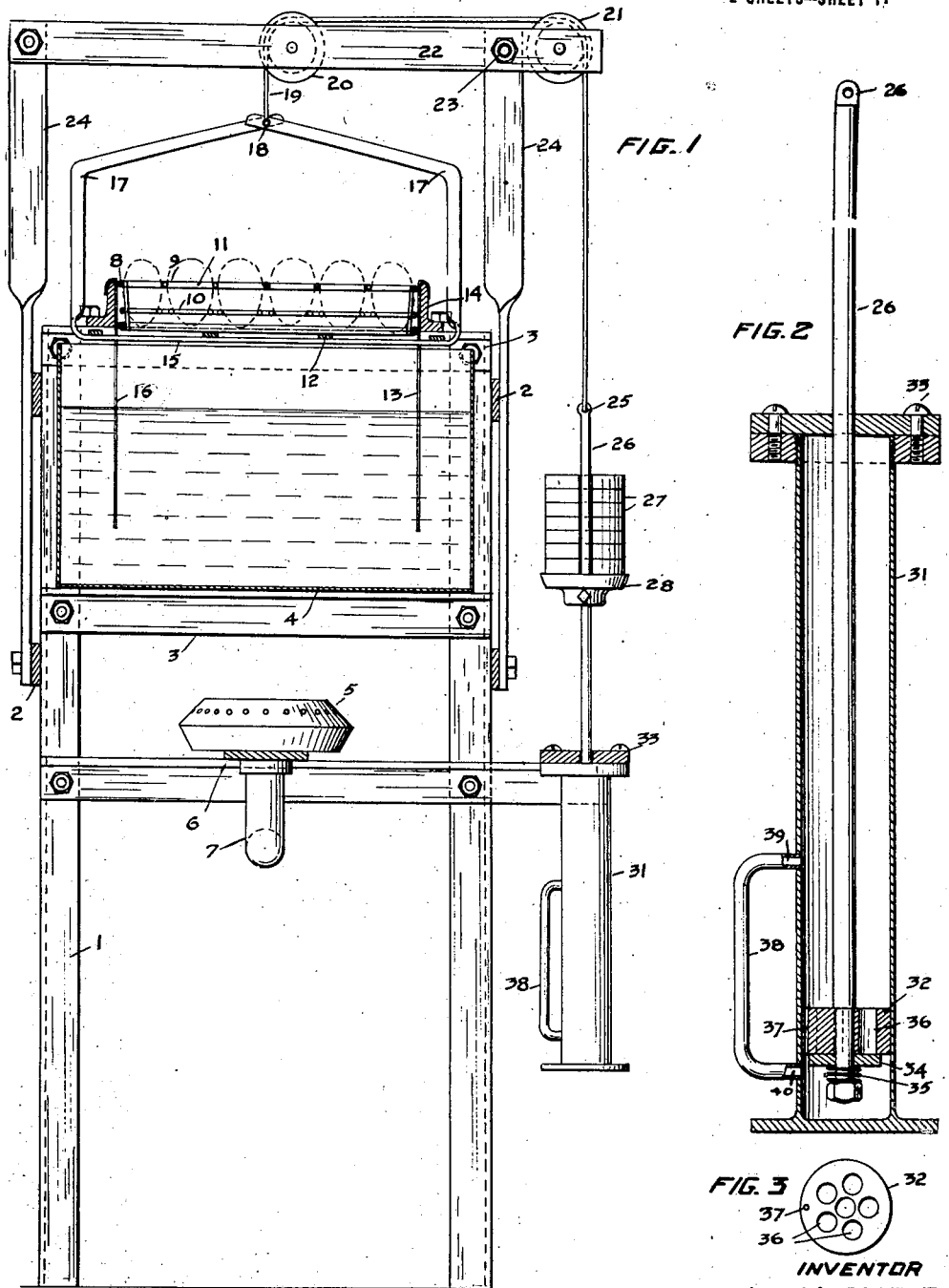

1,369,324.

Patented Feb. 22, 1921.
2 SHEETS—SHEET 2.

INVENTOR
V. CLAIREMONT

UNITED STATES PATENT OFFICE.

VICTOR CLAIREMONT, OF SAN FRANCISCO, CALIFORNIA.

AUTOMATIC EGG-PRESERVING APPARATUS.

1,369,324. Specification of Letters Patent. Patented Feb. 22, 1921.

Application filed March 10, 1920. Serial No. 364,799.

*To all whom it may concern:*

Be it known that I, VICTOR CLAIREMONT, a citizen of the United States, residing at San Francisco, in the county of San Francisco and State of California, have invented new and useful Improvements in Automatic Egg-Preserving Apparatus, of which the following is a specification.

This invention relates to improvements in apparatus for dipping or immersing eggs in a preserving solution and is an improvement on apparatus disclosed in my United States Letters Patent No. 1,224,711, May 1, 1917.

The primary object of this invention is to provide a simple, compact, inexpensive apparatus by means of which large quantities of eggs may be thoroughly treated by being immersed in a solution.

Another object of the invention is to provide an apparatus for dipping eggs in a preserving solution and, which apparatus will maintain the eggs for a predetermined period of time in said solution and automatically lift the eggs out of the solution.

Another object is to provide an apparatus of the character described, in which the eggs are uniformly treated, the movement of the eggs relative to the solution in which they are immersed being such that no one portion of the egg is subjected to treatment for a greater length of time than another portion.

The invention possesses other advantages and features, some of which, with the foregoing will be set forth at length in the following description wherein I shall outline in full that form of the invention which I have selected for illustration in the drawings accompanying and forming a part of the present specification. In said drawings, I have shown one form of the construction of my invention but it is to be understood that I do not limit myself to such form, since the invention as expressed in the claims may be embodied in a plurality of forms.

Referring to the drawings, Figure 1 represents a vertical sectional view taken through the apparatus of this invention.

Fig. 2 is an enlarged vertical sectional view of a part of the automatic egg lifting apparatus.

Fig. 3 is a top plan view of the piston.

Figure 4:
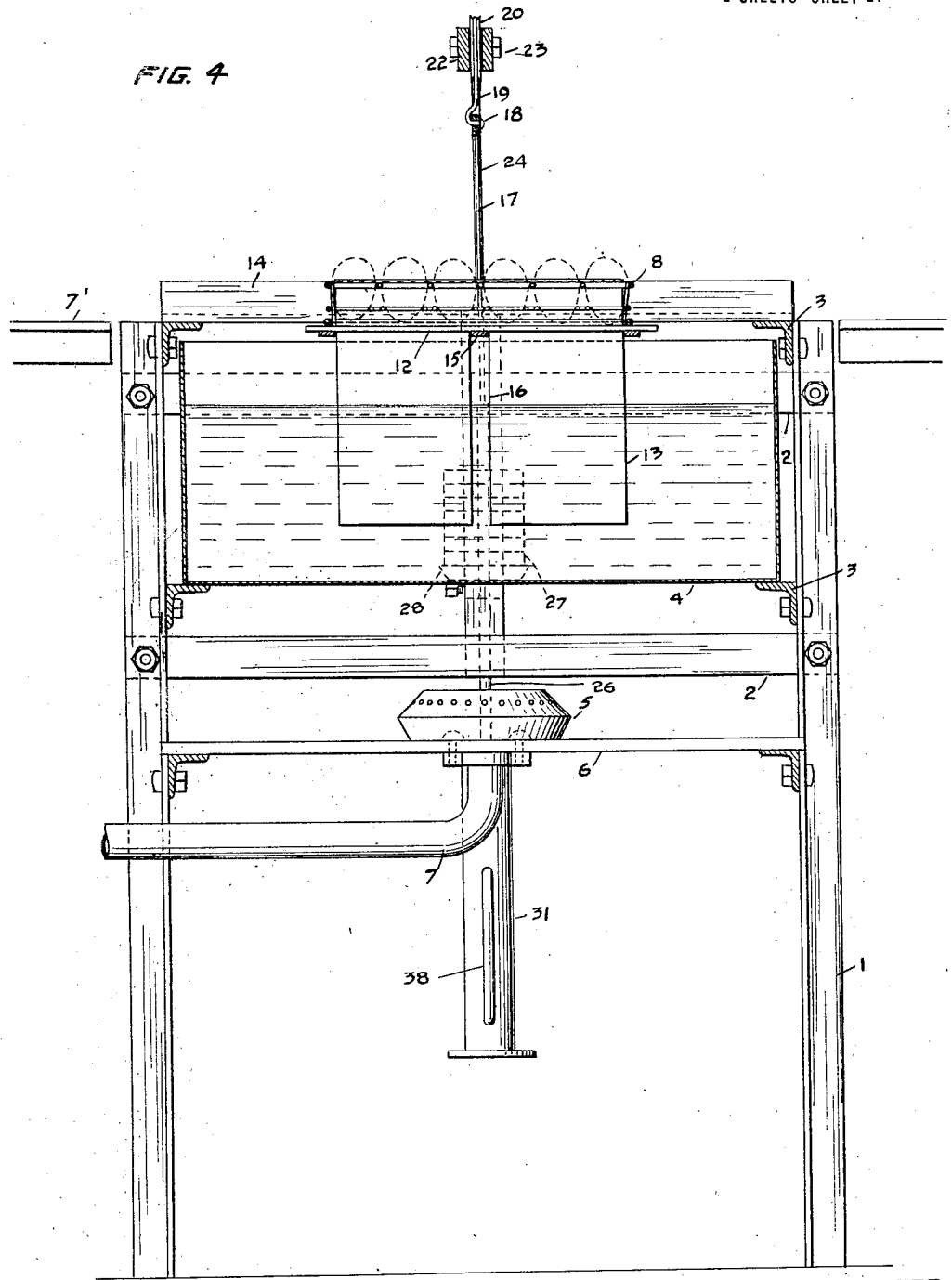
Fig. 4 is a longitudinal sectional view taken through the apparatus.

In carrying out my invention, I provide a tank for containing an egg preserving solution and into which solution eggs, mounted upon a suitable supporting member, are immersed. In connection with the egg supporting means, I employ means for lowering said supporting means into the solution so as to immerse the eggs. After the supporting means has been thus immersed, by the action of an automatic lifting device, the supporting means is lifted slowly so as to maintain the eggs immersed for a predetermined length of time and then at the expiration of the total period of immersion, is lifted quickly out of the liquid. By the slow lifting of the eggs while immersed, I subject them to action of the preserving solution for a predetermined period of time and to prevent the lower portions of the eggs being subjected to the action of the solution for a greater period of time than the upper portions of the eggs, I quickly withdraw or lift the eggs entirely out of the solution.

Referring particularly to the present embodiment of the invention illustrated in the drawing, I provide a suitable frame comprising standards or posts 1 which are connected at their upper ends by side and end pieces 2 and 3 respectively. Supported between the side and end pieces is a preferably rectangular tank or receptacle 4 open on its top only. In this receptacle is contained a suitable quantity of preserving solution. In order to heat the solution, I provide a suitable burner 5 mounted on a cross frame piece 6 beneath the tank and which is supplied with fuel from a suitable source, not shown, by a pipe 7.

Eggs to be treated are delivered to the apparatus by a suitable conveyer 7' in an egg supporting member in the form of a basket 8. The basket 8 is provided with superposed egg supporting surfaces 9 and 10, both of which surfaces are provided with openings 11 in which the eggs are mounted and supported.

The egg baskets delivered from the conveyer 7' slide on to supporting means therefor in the form of a frame 12 which frame is lowered into, and raised out of the tank in the operation of the apparatus. The frame 12 is of skeleton form and vertically movable between opposite guide plates 13 which plates depend into the tank 4 adjacent to opposite sides thereof. The guide plates 13 are bent over and secured to the upper edges of angle iron bars 14, which bars are suitably connected with the frame pieces and extend over and along the opposite sides of the tank 4. The frame 12 is provided with outwardly extending portions 15 which move up and down in slots 16 formed in the plates 13. These extensions 15 are joined with upwardly and inwardly extending arms 17, secured at their ends as at 18, to a cable 19. The cable 19 is mounted upon pulleys 20 and 21, secured in a bar 22. The bar 22 is secured, as at 23, to the upper end of upward extensions 24 of the frame, the cable 19 depending from the pulley 21 and being secured, as at 25, to a weight supporting rod 26. The rod 26 supports a plurality of movable weight units 27, which units rest upon a plate 28 connected with the bar or rod 26 and with the upper end of a piston rod 26. The piston rod 26 is reciprocably mounted in and extends through the upper end of a dash-pot cylinder 31 and upon its lower end carries a piston 32 which piston is reciprocally mounted in the cylinder 31. The cylinder is preferably filled with suitable inelastic fluid, such as oil, and supported, as at 33, upon the frame piece 6. The piston 32 is provided with a downwardly opening check valve 34 normally held closed by a spring 35. This valve 34 controls vertical ports 36 extending through the piston on one side thereof. A relief port 37, formed relatively small is provided in the piston 32. A by-pass pipe 38 is connected with the lower end of the cylinder and with ports 39 and 40 respectively.

The apparatus operates as follows:—

In a basket 8, the eggs are moved on to the frame 12, from the conveyer 11, and an operator then pushes the frame 12 downwardly by pressure applied upon one of the arms 17. The egg supporting basket 8 with the eggs is thus lowered into the solution in the tank 4 until the eggs are immersed. In the actual operation of the apparatus, all that is needed to accomplish this action is for the operator to give a quick downward push to the frame 12, the rest of the operation of the apparatus being automatic as will be apparent from the following description.

As the frame 12 is pushed downwardly, the cable 19 is pulled up, and lifts the weight, at the same time pulling up on the piston rod 26 and causing the piston 32 to move upwardly into the upper part of the cylinder 31. The dash-pot device during this movement of the apparatus offers little or no resistance to movement of the piston inasmuch as the check valve 34 will open and permit fluid in the cylinder to readily pass through ports 36 in the piston. As soon as the downward pressure on the arm 17 applied by the operator to lower the frame 12 is removed, the eggs having been immersed by said pressure, the weight 27 will lower and through the cable 19 lift up the frame 12, together with the basket 8 and eggs thereon. This lifting up of the frame 12, is controlled by the dash-pot device. As soon as the weights 27 begin to lower, the oil in the cylinder 31 serves as a check to retard the downward movement of the piston 32, the oil escaping past said piston through the relatively small relief port 37 only. The weights 27 are arranged in this form of the invention so that a period of 7½ or 8 seconds is required to lift the frame 12 and basket 8 with the eggs thereon out of the immersed position in the tank. It is to be noted that more or less of the weight units 27 may be used in order to regulate the period of time in which the eggs are immersed in the solution. As soon as the piston 32 passes the port 39 for the by-pass pipe 38 the oil will pass freely through the pipe 38 and into the upper part of the cylinder. This will permit the piston 32, piston rod 26, and weights 27 to descend quickly and by this action, through the cable 19, the frame 12 before being completely withdrawn from the liquid is quickly but steadily lifted clear of the solution. This quick action begins when the upper ends of the eggs first project out of the solution, with the result that the lower ends of the eggs are not subjected to the action of the preserving solution any longer than the upper ends and consequently the eggs are uniformly treated. Eggs treated with this apparatus will be of uniform appearance and keep for a longer period of time than those eggs which are not uniformly treated. Certain deleterious effects occur by too long a subjection of the lower portions of the eggs to the action of the hot solution. This is manifested in some cases by a discoloration of the meat.

Heretofore egg dipping apparatus had to be carefully watched by an attendent in order to prevent keeping the eggs for too long a period in the solution. With my improved automatic apparatus, operating in several units one attendant or operator is sufficient and can operate the apparatus since after depressing one basket during the intervening time of 7 to 8 seconds, he may depress the other baskets in the other units.

In the past, egg dipping apparatus has been actuated by machinery to lower or dip the eggs in the preserving solution. In apparatus of this character if the operator for any reason has to leave the machine the eggs after dipping once will, unless removed from the apparatus be dipped again with the result that to prevent the dipping of the eggs several times the operator must stand by the machine and closely follow the operation thereof so as to remove the eggs at the proper time. With my apparatus the operation of lowering or dipping the eggs must be done by hand.

In the operation of my machine the operator may push the frame supporting the eggs downwardly into the solution and then operate another similar machine or if desired walk away from the machine, it not being necessary for him to remove the eggs after one dipping operation to prevent several dippings. This is due to the fact that after the eggs are dipped they are automatically raised and are not again dipped unless the operator again pushes the frame supporting the eggs downwardly into the solution. One of the most essential features of this invention is the provision of a machine which is manually operated to dip the eggs and operates automatically to lift the eggs and maintain the eggs once lifted in such lifted position.

I claim:—

1. In apparatus of the character described a tank containing a preserving solution, an egg supporting member, means for lowering said member into the tank to immerse eggs supported thereon, and means automatically operating to first slowly then quickly lift said member out of the solution.

2. An apparatus of the character described, a tank containing an egg preserving solution, means for supporting a plurality of eggs, means for lowering said means and the eggs into the tank to immerse the eggs in the solution, and means operating to slowly lift the supporting means until the upper portions of the eggs reach the level of the solution and then quickly lifting said supporting means to lift the eggs clear of the solution.

3. In apparatus of the character described a tank containing a preserving solution for eggs, means for dipping eggs into the solution, and means for lifting the eggs from the solution at an irregular rate of speed.

4. In apparatus of the character described a tank containing an egg preserving solution, means for supporting eggs to be immersed in the solution, a support for said means mounted to move into and out of the solution in said tank, and means operating automatically when the last named support has been lowered to immerse the eggs to lift said support at a varied rate of speed.

5. In apparatus of the character described a tank containing a liquid, means for dipping eggs into the liquid, and means operating to first lift the eggs slowly until the upper portions of the eggs reach the level of the liquid, then quickly lifting the eggs clear of the liquid.

6. In apparatus of the character described, a tank containing a preserving solution for eggs, a basket for supporting eggs, a basket supporting frame mounted to move into and out of the solution in the tank, a pulley mounted above said frame, a cable extending over the pulley and secured to said frame, a weight attached to said cable and means for varying the rate of descent of weight.

7. In apparatus of the character described, a tank containing an egg preserving solution, means for supporting a plurality of eggs, means manually operable only to lower said supporting means so as to immerse the eggs in the solution and means operating automatically when the eggs have been lowered and immersed in the solution, to raise said eggs out of the solution and maintain the eggs in raised position.

8. In apparatus of the character described a tank containing an egg preserving solution, means for lowering eggs into the solution and means operating automatically after the eggs have been lowered, to raise the eggs out of the solution and maintain the eggs in raised position.

VICTOR CLAIREMONT.